UNITED STATES PATENT OFFICE.

LUCIEN ALFRED WILHELMINE DESRUELLES, OF PARIS, FRANCE.

UTILIZATION OF THE RESIDUAL LIQUIDS FROM BATTERIES.

SPECIFICATION forming part of Letters Patent No. 350,296, dated October 5, 1886.

Application filed April 21, 1886. Serial No. 199,719. (No specimens.)

*To all whom it may concern:*

Be it known that I, LUCIEN ALFRED WILHELMINE DESRUELLES, a citizen of the Republic of France, residing in Paris, France, have invented new and useful Utilization of the Residual Liquids from Batteries, of which the following is a specification.

The great power or energy possessed by bichromate batteries results from their high electro-motive force added to their low internal resistance. This low internal resistance is chiefly due to the great conductivity of the liquids employed, but as this conductivity diminishes somewhat rapidly during the working of bichromate batteries it follows that their internal resistance rapidly increases and their discharge decreases although their potential remains about the same. After a certain time, consequently, the energy of bichromate batteries diminishes although the chemical properties of their liquids are not perceptibly modified, as shown by the relative constancy of their electro-motive force. When, owing to its increased resistance, the discharge from a bichromate battery becomes weakened, the battery is no longer capable of supplying a current of sufficient intensity, but it still possesses, although in a condition which renders it unavailable, a sum of latent energy which should not be wasted. According to this invention the residual or waste liquids from these batteries, which liquids present resistance, but yet possess a capacity for producing with suitable electrodes a certain electro-motive force, are employed for charging electric batteries—such as those used for telegraphs, for example—and in which the internal resistance is an unimportant quantity. In fact, telegraphic batteries are in most cases required to supply a current which passes through considerable external resistance, so that the internal resistance of the battery need not be taken into account, owing to the small quantity of electricity which they expend. Under these conditions the electro-motive force is the most important factor. Now, a high electro-motive force can be supplied by the residual liquids from bichromate batteries; consequently these residual liquids may be used with good effect in telegraphic batteries. Impressed with the truth of this assertion I have sought to utilize to the best advantage the residual liquids of powerful batteries—such as bichromate batteries—as electrolytes in telegraphic batteries, and such utilization forms the object of the present invention. The residual liquids that are taken from such powerful batteries are highly charged with acids or corrosive substances of various descriptions, and are consequently difficult or dangerous to transport. In consideration of the great distances separating telegraphic stations the facile conveyance of the materials employed in charging the batteries becomes a question of the highest importance. I have therefore sought to solve this question in the first instance. This I have accomplished in the following manner: The residual liquids are mixed in suitable proportions with any inattackable or acid-proof and porous substance capable of forming a paste therewith. This paste is afterward dried, either by natural evaporation or by vaporizing the water which it contains by the application of artificial heat—such as the heat of a stove, for example. The paste is divided in the first place into cakes, each containing a sufficient quantity of the chemicals to charge a cell or element of a telegraphic battery. When the cakes are dry, they can be very conveniently conveyed to the places where they are required. The materials may be supplied either in the form of cakes or blocks or in the condition of dust or powder, if previously reduced to this latter state by any suitable means. In order to use them they are simply placed in the bottoms of the cells or elements, which are then filled up with pure water. The water dissolves the acids and salts contained in the cakes, and the inattackable and porous material settles at the bottom of the element. The inattackable and porous material that I have found to yield the best results is kieselguhr, a diatomaceous earth or earth composed of the remains of diatoms, and consequently consisting entirely of almost pure silica.

I claim as my invention—

1. The mode herein described of utilizing the residual liquids from bichromate and other powerful batteries, said mode consisting in mixing an acid-proof and porous substance with the said residual liquids and drying the paste thus produced to form a substance for charging batteries for telegraphic lines and other uses.

2. As a new material for charging batteries, the herein-described substance consisting of the residual liquids from bichromate and other powerful batteries, mixed with acid-proof and porous material, substantially as specified.

3. The herein-described substance for charging batteries, said substance consisting of kieselguhr mixed with residual liquids from bichromate or other powerful batteries.

In testimony whereof I have signed my name to this specification in the presence of two subscribing witnesses.

LUCIEN ALFRED WILHELMINE DESRUELLES.

Witnesses:
  LÉON FRANCKEN,
  ROBT. M. HOOPER.